United States Patent [19]

Brady et al.

[11] Patent Number: 5,259,342

[45] Date of Patent: Nov. 9, 1993

[54] METHOD AND APPARATUS FOR LOW NOX COMBUSTION OF GASEOUS FUELS

[75] Inventors: Robert T. Brady, Elmhurst; Dean C. Townsend, Northbrook, both of Ill.; George A. Weller, Blainville, Canada; Joseph H. Werling, Mundelein, Ill.

[73] Assignee: Mark IV Transportation Products Corporation, Niles, Ill.

[21] Appl. No.: 760,023

[22] Filed: Sep. 11, 1991

[51] Int. Cl.$^5$ .............................................. F22B 23/06
[52] U.S. Cl. ................................. 122/367.1; 110/234; 110/345; 110/347; 60/276
[58] Field of Search ............... 110/345, 347, 234; 122/367.1; 431/76; 236/158

[56] References Cited

U.S. PATENT DOCUMENTS

| | | | |
|---|---|---|---|
| 2,735,410 | 2/1956 | Armbrust et al. | 122/448 |
| 2,998,807 | 9/1961 | Clarkson et al. | 122/249 |
| 3,226,038 | 12/1965 | Brady et al. | 239/405 |
| 3,282,257 | 11/1966 | McInerney et al. | 122/250 |
| 4,004,875 | 1/1977 | Zink et al. | 431/9 |
| 4,056,932 | 11/1977 | Nakamura et al. | 60/276 |
| 4,065,920 | 1/1978 | Minami et al. | 60/276 |
| 4,075,834 | 2/1978 | Saito et al. | 60/276 |
| 4,106,214 | 8/1978 | Schmidt | 34/86 |
| 4,162,140 | 7/1979 | Reed | 431/284 |
| 4,403,473 | 9/1983 | Gladden | 60/274 |
| 4,538,551 | 9/1985 | Brady et al. | 122/367.1 |
| 4,568,266 | 2/1986 | Bonne | 431/76 |
| 4,762,074 | 8/1988 | Sorensen | 110/345 |
| 4,776,320 | 10/1988 | Ripka et al. | 126/99 |
| 4,926,765 | 5/1990 | Dreizler et al. | 110/234 |
| 4,928,605 | 5/1990 | Suwa et al. | 110/347 |
| 4,983,118 | 1/1991 | Hovis et al. | 431/115 |
| 4,995,807 | 2/1991 | Rampley et al. | 431/9 |
| 5,002,484 | 3/1991 | Lofton et al. | 432/222 |
| 5,016,610 | 5/1991 | Meguro et al. | 126/91 |

Primary Examiner—Henry C. Yuen
Attorney, Agent, or Firm—Francis J. Lidd

[57] ABSTRACT

A method and apparatus for low NOX combustion of natural gas in a compact steam boiler having output steam delivery controlled by predetermined outlet steam pressure. The compact boiler employs a small high heat release combustor discharging into a forced draft convective heat exchange section. In operation, the compact boiler is completely and automatically self-operating, employing flue gas recirculation (FGR) wherein the FGR is admitted into the burner combustion air through a valve controlled by boiler flue gas NOX content. A novel bell mouthed flue gas scoop is utilized in the boiler stack upstream of the NOX sensor. In an alternate combustion chamber design, a cylindrical water wall coil surrounds the combustion process, increasing boiler efficiency through the inherent large temperature difference between the coil and the combustion in process, along with reducing the combustion temperature and further reducing the NOX content of combustion products. A further variation in the combustion system utilizes a ceramic shield surrounding a natural gas burner as it fires into the compact combustion chamber. Primary and secondary combustion air are admitted to the combustion chamber through first stage combustion internal of the shell and second stage combustion occurring internal of the boiler combustion chamber.

12 Claims, 4 Drawing Sheets

METHOD AND APPARATUS FOR LOW NOX COMBUSTION OF GASEOUS FUELS

BACKGROUND OF THE INVENTION

This invention relates primarily to low NOX combustion of gaseous fuels and more particularly concerns combustion in compact boilers and liquid phase heaters employing flue gas recirculation (FGR). Apparatus and methods disclosed in this application employ improved methods of recovering and controlling boiler stack flue gas and use of novel combustion chamber designs to reduce NOX produced in the combustion process.

In a preferred embodiment, the invention disclosed herein is utilized in a compact boiler. Compact boilers are typified by heat release per cubic foot of boiler occupancy or unit space required for installation of several orders of magnitude greater than conventional boilers such as Scotch Marine or D frame designs. Compact boilers necessarily employ small combustion chambers demonstrating high heat release in the order of 500,000 BTU's per cubic foot of combustion volume. Although providing economical and space conserving boilers and fluid heaters, the compact designs result in inherently high temperatures generated in high heat release combustion system demonstrating percentages of NOX in combustion gases as high as 2000 parts/million (Volume, DRY).

Recent governmental regulations arising from air quality laws have drastically reduced the amount of allowable NOX in boiler flue gas which can be vented to the atmosphere. Therefore, many designs employing various techniques to reduce NOX are currently in use, including flue gas recirculation and so-called staged combustion to lower combustion temperatures and thereby hold NOX emissions in the stack gas to a predetermined level.

A typical compact boiler is disclosed and claimed in U.S. Pat. Nos. 2,735,410, 3,226,038 and 3,282,257 incorporated by reference herein. As disclosed in these references, the compact boiler is fully automatic in its operation and provides steam or heated fluids to widely fluctuating thermal loads. Compact boiler control may be of the type disclosed in U.S. Pat. No. 2,735,410, incorporated by reference above, or a similar method including programmed start-up and firing rates proportional to steam and/or heated liquid delivery rates. The fully automatic load range variation can result in "turn down ratios", i.e. the ratio of fuel admission over the boiler operating load range, as high as 600%.

Compact boilers have been in use for many years and demonstrate good operating records, however, in order to legally operate units of this type, it is necessary to reduce the NOX emissions.

Low NOX burners using flue gas recirculation (FGR) are old in the art and include the following U.S. Pat. Nos.

U.S. Pat. No. 4,995,807
U.S. Pat. No. 5,002,484
U.S. Pat. No. 4,162,140
U.S. Pat. No. 4,776,320

While these systems can be effective in reducing NOX, the concepts and structures disclosed cannot be used in boilers of the compact type since the systems disclosed in these references are utilized in large capacity, large volume boilers operating at essentially constant firing rates. These designs, therefore, do not address the difficulties encountered in applying flue gas recirculation to a compact unit having a 600% variation in fuel rate.

Therefore, it is an object of this invention to provide a low NOX boiler using novel flue gas stack recovery method.

It is an additional object of this invention to provide a burner for a compact boiler wherein NOX concentration in boiler flue gas controls flue gas and combustion air mixing, thereby limiting the NOX content of combustion gases emitted to the atmosphere to a predetermined value over a 600% variation in boiler fuel rate.

It is yet an additional object of this invention to provide apparatus for controlling the NOX content of flue gas emitted to the atmosphere from a compact boiler through utilization of flue gas recirculation and a water wall combustion chamber.

It is yet an additional object of this invention to provide a low NOX combustor for a compact boiler utilizing a staged air burner in a water wall combustion chamber.

Further objects and advantages of the present invention will become apparent as the description proceeds and the features of novelty which characterize the invention will become apparent those skilled in the art.

SUMMARY OF THE INVENTION

In accordance with the invention, there is disclosed herein a compact boiler utilizing a high heat release combustion chamber (approximately 500,000 BTU's per cubic foot) utilizing forced air combustion and heat exchange to boiling or heated fluids. These units typically are automatic in operation having fuel to air ratios and fuel firing rates controlled entirely by the pressure of delivered steam or temperature of heated liquid supplied to the boiler thermal load. Applicants' discovery pertains to apparatus and control systems which limit the NOX content of emitted flue gases over the entire 600% fuel rate variation to acceptable levels.

The invention disclosed overcomes the difficulties encountered in systems in current use including inadequate flue gas recirculation at low firing rates which must necessarily be boosted through the use of auxiliary blowers. Applicants have discovered that a more cost effective method utilizes a novel bell mouthed scoop located in the boiler outlets stack. Use of the boilers combustion air blower to provide forced flue gas recirculation is a cost effective means and eliminates the use of an auxiliary blower.

Further, applicants have discovered the use of an intermediate ambient air admission control valve operated by the NOX concentration in combustion gases downstream of the flue gas recovery scoop provides a system in keeping with the self-operating concepts of the compact boiler over its entire operating range.

In an alternate embodiment, applicants have discovered that use of a water wall combustion chamber typically consisting of helically wound fluid carrying tubing surrounding the combustion process. This configuration further reduces NOX production in the combustion process through a reduction in temperature of the combustion process. This technique also provides improved boiler efficiency through circulating entering or low temperature boiler feed water or fluid to be heated through the water wall. Under these conditions, those skilled in the art will readily understand that this arrangement provides for a maximum temperature difference between the combustion process and the entering fluid.

A second alternate embodiment disclosed herein is a novel adaptation of staged combustion to compact boiler designs. As disclosed, it has been discovered that surrounding a gaseous burner with a refractory shell, properly positioned within the boiler combustion chamber, further reduces NOX concentration of the exhaust flue gas.

Therefore, it is an object of this invention to provide NOX emission control for an automatically operated pre-programmed start-up compact boiler utilizing flue gas recirculation.

It is a further object of this program to provide a flue gas recirculating system for an automatically operated compact boiler providing NOX control through modulation of combustion air input.

It is yet an additional object of this invention to provide a flue gas recirculating system for control of NOX emissions in a compact boiler utilizing capture of stack gas by a bell mouthed scoop.

It is a further object of this invention to provide a low NOX emitting combustion system for a compact automatic operating boiler gaseous fuel combustion temperatures are reduced by use of a water wall combustion chamber.

It is yet an additional object of this program to provide a low NOX combustion system for a compact boiler wherein a single combustion air blower captures boiler stack gases for recirculation through the boiler combustion chamber.

It is an additional object of this invention to provide a low NOX burner for a compact boiler providing reduced combustion temperatures through the use of staged combustion.

BRIEF DESCRIPTION OF THE DRAWINGS

Other objects and advantages of the combustion systems and flue gas recapture means disclosed herein will become apparent on reading the following detailed description and upon reference to the drawings in which.

DETAILED DESCRIPTION OF THE INVENTION

Figure 1:
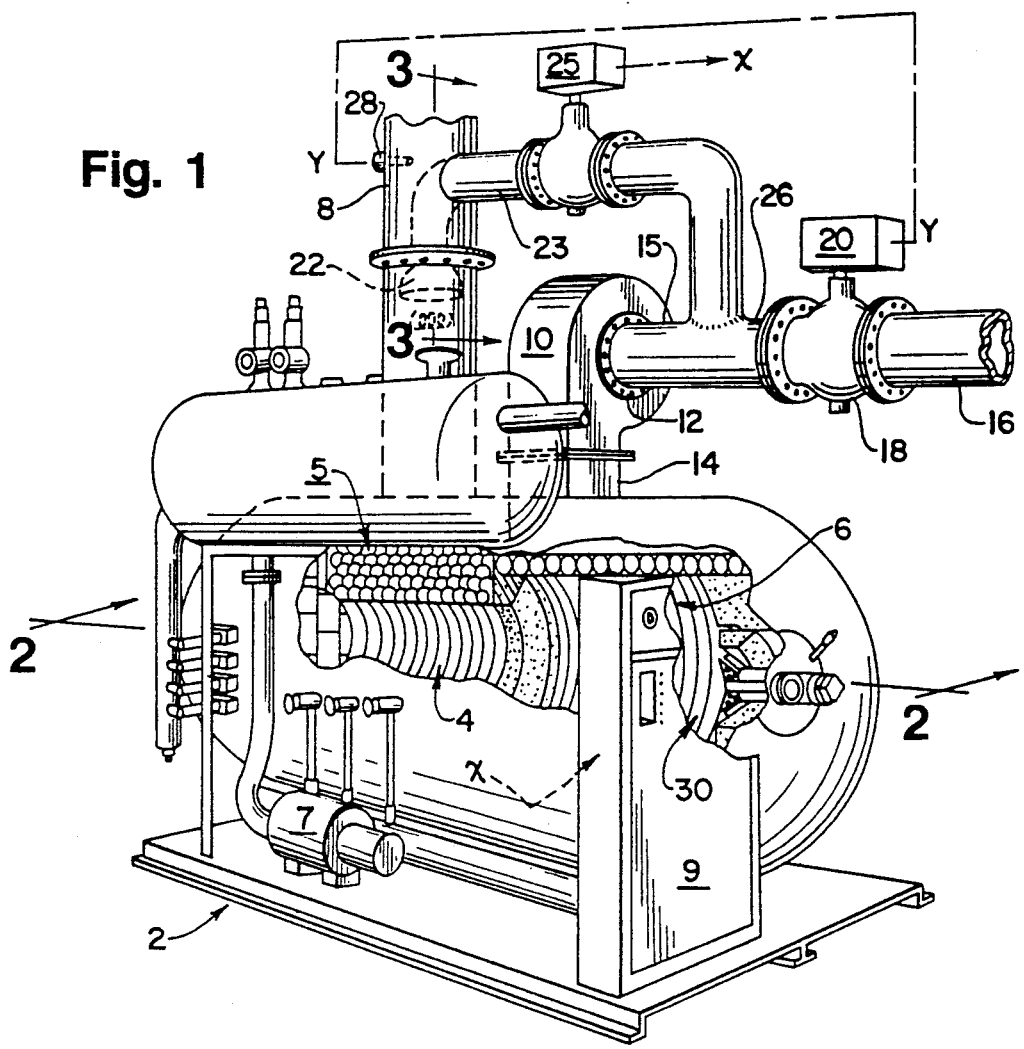
FIG. 1 is a semi-diagrammatical perspective drawing of the boiler and flue gas recirculation system of the invention, particularly showing, in cut-away, the combustion and heat exchange portions of the boiler.
Figure 2:
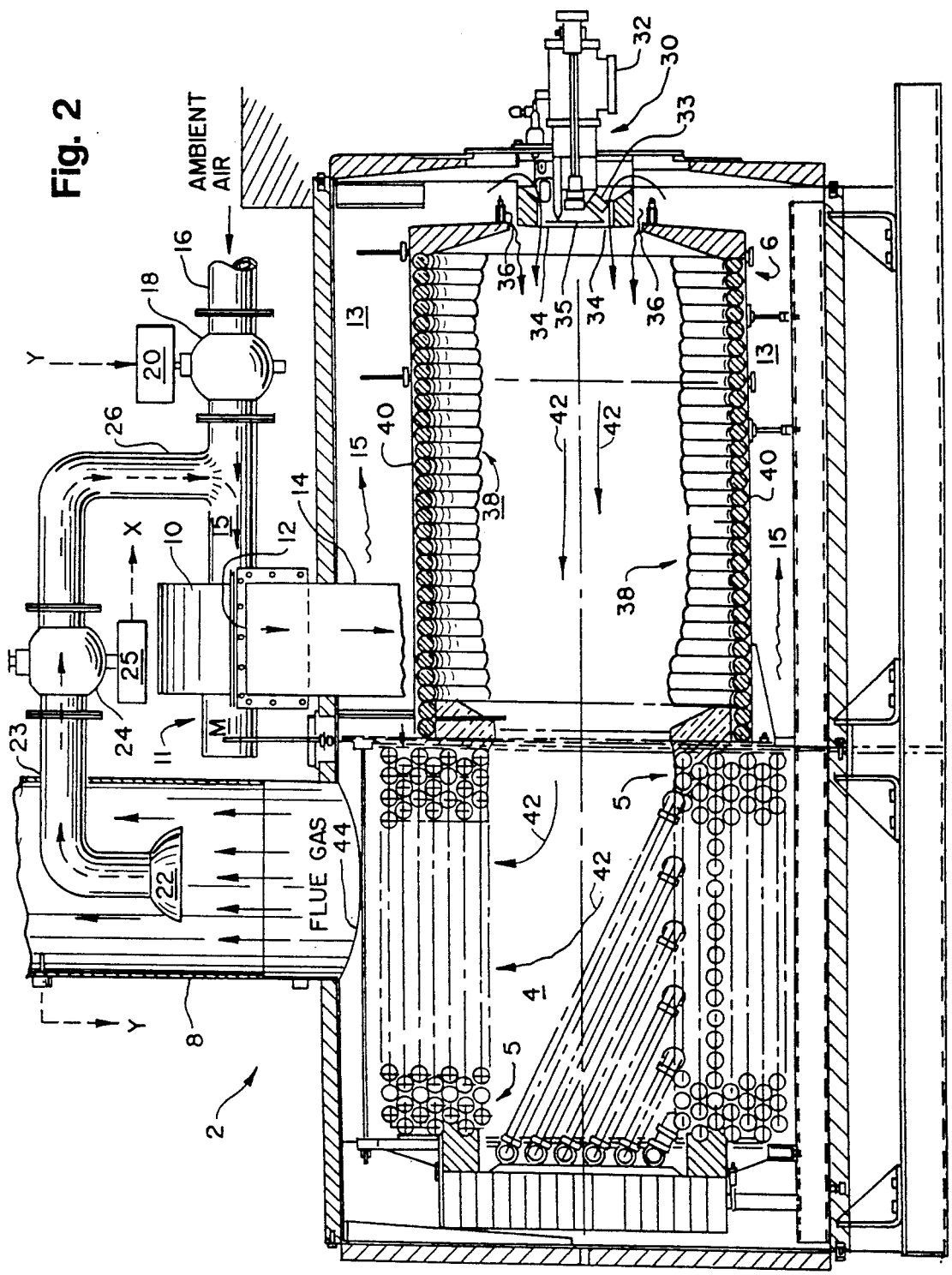
FIG. 2 is essentially a cross-section along the line 2—2 of FIG. 1, particularly showing a water wall combustion chamber and combustion air preheating plenum of a compact boiler.

In particular reference to FIGS. 1 and 2, there is shown a compact boiler assembly 2 having, at one end, a heat exchange assembly 4 comprising helically wound tubing coils 5. Oppositely disposed to the heat exchange end 4 is a combustion end 6 having a burner assembly 30 for generating high temperature products of combustion.

Combustion products generated in the combustion end 6 enter the combustion chamber 38 and exit the heat exchange assembly end 4, pass through helical coil assembly 5 and enter the flue gas stack 8. Heat extracted from the combustion gases in passing through the water wall chamber 38 and the tubing coils 5 is used to produce steam or heat other liquids flowing through the aforementioned coil assemblies. The boiler assembly 2 further comprises a feed water pump 7 utilized to circulate the heated medium and/or produce steam. A control and instrument panel housing 9 containing program controllers, heated medium gauges and other operating equipment required to fully automate the compact boiler.

The combustion assembly 6 further includes a combustion air blower 10 driven by a drive motor 11. Combustion air comprising a mixture of recirculated flue gas and ambient air is forced into the combustion air plenum chamber 13 via the blower outlet 14. Combustion air passes through the plenum chamber 13 in the direction shown at 15, passing over the outer surfaces of the combustion chamber assembly 40, further extracting heat from the water wall combustion chamber 38. It should be noted that the water wall combustion chamber 38 and combustion chamber plenum 13 are fluid isolated, one from the other.

In keeping with the invention disclosed herein, combustion ambient air enters the combustion air blower 10 at its inlet 12 via combustion air inlet duct 15. Similarly, ambient air enters the combustion air blower inlet via duct 16 passing through ambient air control valve 18. Control of ambient air in the disclosed flue gas recirculating system is an important aspect of the invention disclosed herein and will be treated in more detail.

Figure 3:
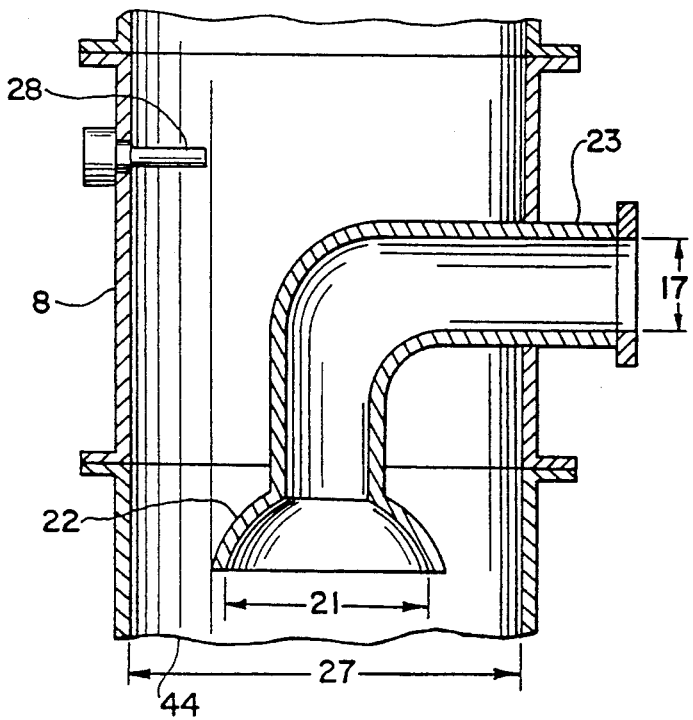
FIG. 3 is a partial cross-sectional view of the novel flue gas capture scoop of the invention along the line 3—3 of FIG. 1.

Exhaust gases entering the exhaust gas stack 8 at the heat exchange outlet 44 are captured by a bell mouthed scoop 22 positioned as shown in FIG. 3 in the exhaust stack 8. Captured flue gas passes through flue gas stack duct 23 and shutoff valve 24 controlled by valve actuator 25, mixing with ambient air exiting ambient air valve 18 in a mixing tee 26.

It has been discovered that effective recirculation of exhaust gases is achieved by utilizing a bell mouthed scoop wherein the open or collecting area is approximately 20% of the exhaust stack cross-sectional area. For a typical 350 H.P. compact boiler, dimensions, 17, 21, and 27 would be 8 inches, 10 inches and 24 inches, respectively.

In keeping with an important aspect of the invention disclosed herein, a NOX sensor 28 is positioned in the boiler exhaust stack 8 downstream of the bell mouthed scoop 22. Valve actuator 20, controlling ambient air inlet valve 18, is responsive to NOX level signal supplied by sensor 28 and modulates incoming air so as to control the amount of NOX flowing into the ambient via exhaust stack means (not shown) in fluid communicating with duct 8. Those skilled in the fluid handling arts will readily see that the combination of sensor 28, valve 18 and combustion air blower 10 essentially provide control of the concentration of recirculated NOX entering the boiler combustor via the blower inlet 15 and exit 14 without the need for an external or auxiliary flue gas blower. The configuration disclosed provides a novel and substantial advance in the art of flue gas recirculation.

Turning now to FIG. 2, at the combustion end 6 of the compact boiler 2 there is contained a burner assembly 30 comprising a gas inlet 32, having annular primary combustion air inlets 34 and secondary combustion air inlets 36 admitting combustion air in circumferential flow paths around the burner assembly 30. The burner assembly 30 has gaseous fluid admitting nozzles 33 and a flame spreading cone 35 (reference FIGS. 4 and 5). The entire burner assembly 30 is central and coaxial of the helically wound tubing 40 comprising the internal portion of the cylindrical water wall combustion chamber 38. Boiler feed water and/or heated fluid is pumped through the helically wound tubing 40, thereby absorbing heat and cooling combustion gases 42 flowing as shown, internal of the chamber 38.

Combustion air exiting the combustion air blower 10 at its outlet 14 passes through the above mentioned plenum 13 and flows as shown at 15 therein. Heated plenum combustion air enters the combustion chamber 38 via the aforementioned annular primary and secondary air inlets 34 and 36. Fuel gas enters the burner inlet 32 via a conventional piped or ducted system (not shown).

In operation, mixtures of combustion air and flue gas properly apportioned by a program control contained in cabinet 9 enter the combustion chamber 38 via annular ports 34 and 36, combining with gaseous fuel injected via nozzles 33 and diffused into the air entering via ports 34 by the spreading cone 35, are ignited by igniting means (not shown). High temperature combusting gases generated by the burner flow through the chamber 38 adjacent to the tubes 40, as shown at 42. After passing through the heat exchange coil assembly 5, the high temperature combustion products or flue gas enter the boiler exhaust stack 8 at interface 44. In flowing through the stack 8 a predetermined amount of flue gas is captured via the bell mouthed scoop 22, with the remainder exiting the exhaust end of stack 8 (not shown) to the atmosphere.

Captured flue gas flowing through duct 23 passes through shutoff valve 24 controlled by valve actuator 25. As valve 25 in this configuration is an additionally important aspect of the invention disclosed, further description will follow.

Captured flue gas passes through valve 24 and enters a mixing tee 26 where ambient air passing through valve 18 while mixed with flue gas at tee 26 enters duct section 15 and combustion blower inlet 10 for forced recirculation through the combustion plenum chamber 13. The pressurized combustion air of plenum chamber 13 is as described above, then recirculated through the burner assembly via annular ports 34 and 36.

Figure 6:
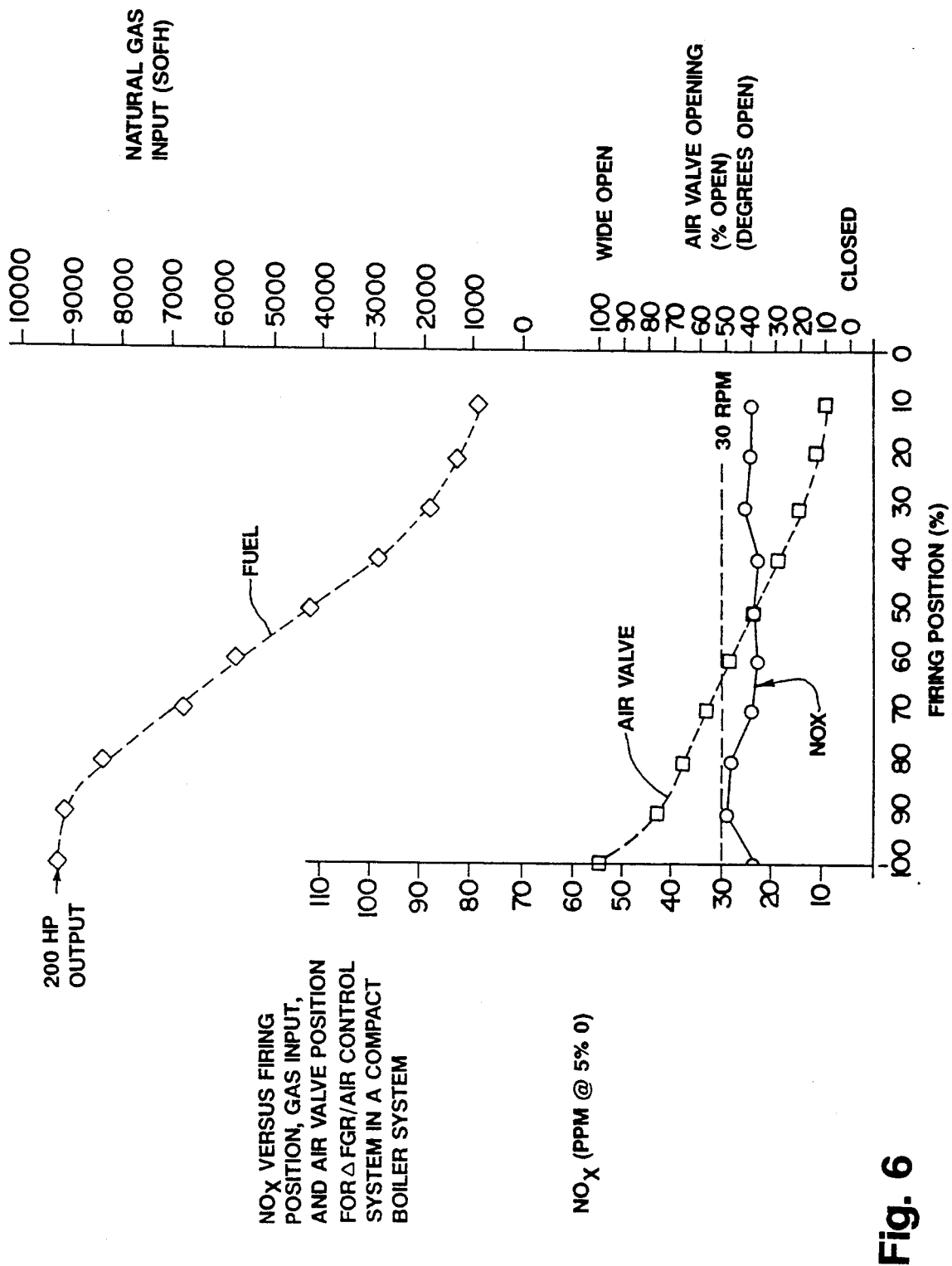
FIG. 6 shows performance results of the combustion system of the invention, particularly showing maintenance of a pre-determined level NOX in boiler stack emissions.

The NOX sensor 28 controls admission of ambient air via valve 18, thereby operating the boiler combustion system at a predetermined level of NOX. Results of operation with the system disclosed herein are shown on FIG. 6 wherein over a fuel rate ratio of one hundred-to-one, a predetermined NOX level has been achieved through control of combustion chamber temperatures through use of a water wall combustion chamber, and flue gas recirculation.

An additional aspect of the control system disclosed herein is use of a control shutoff valve 24 in the NOX recirculating duct 23. Those skilled in the compact boiler arts will understand that self-operating automatically controlled firing boilers such as disclosed herein employ a programmed start-up phase wherein the combustion and heat exchange sections of the boiler are purged or flow exhausted by combustion air prior to initiating combustion to insure start-up without previous fuel concentrations. Under these conditions, without the presence of valve 25, absence of NOX would essentially shut down the air valve thereby preventing the necessary purge of the boiler combustion system, resulting in terminating the entire start-up phase. In keeping with the invention disclosed herein, the automatic start-up cycle includes closing valve 24 through operation of controller 25 during the purge portion of the start-up cycle.

Figure 4:
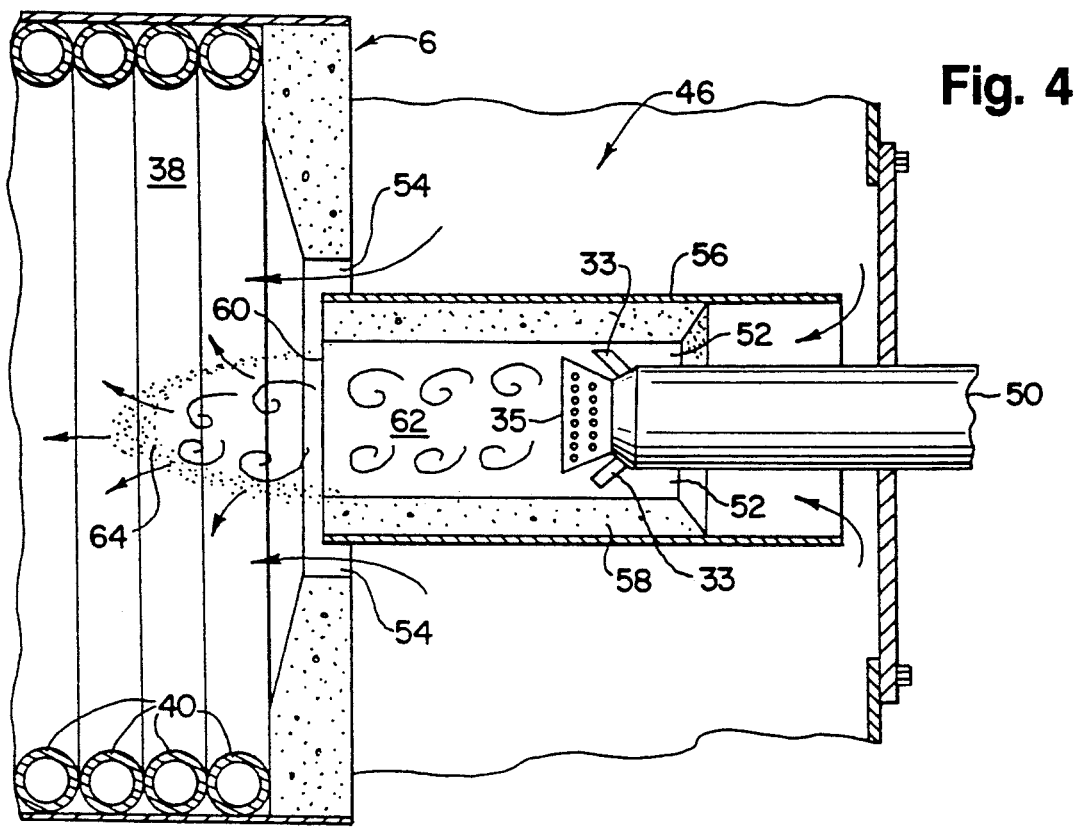
FIG. 4 is a cross-sectional view a portion of the combustion end of the compact boiler of the invention, particularly showing an alternate embodiment of the combustor of the invention utilizing staged combustion.
Figure 5:
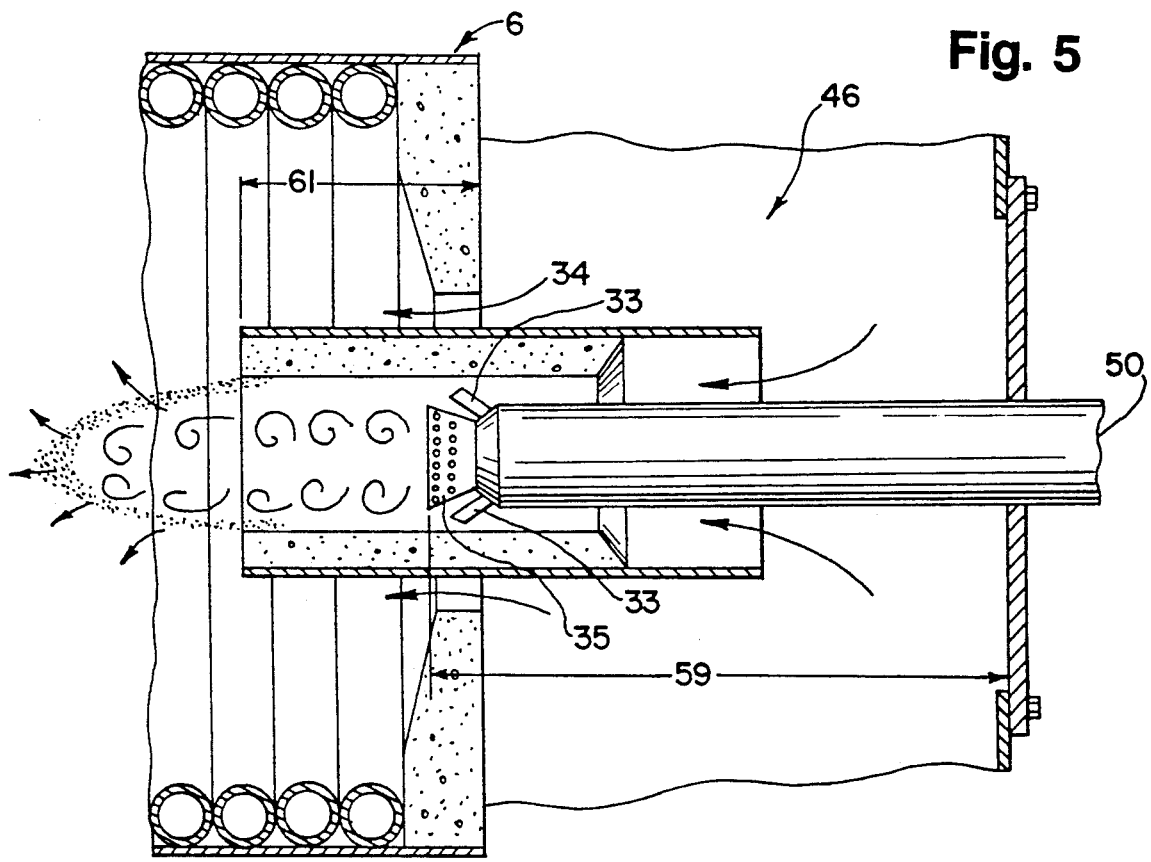
FIG. 5 is an additional cross-section similar to that of FIG. 4 showing the alternate embodiment burner of the invention in an alternate position internal of the water wall combustion chamber of the invention.

FIGS. 4 and 5 show an alternate embodiment of the burner system described above. In particular, with reference to FIG. 4, there is shown a combustor assembly 46 comprising an outer cylindrical shell 56 having an internal refractory liner 58. Coaxial with and internal of the liner 58 is the burner assembly utilized in the preferred embodiment as disclosed herein, consisting of the fuel gas inlet 50, fuel gas nozzles 33 and and perforated flame spreading cone 35. As in the preferred embodiment burner, annular primary and secondary combustion air inlets 52 and 54, respectively, are defined by the position of the burner assembly gas inlet 50 and burner outer shell 56, respectively.

With these constructions, combustion proceeds in several sequential stages, i.e., initially fuel rich in the area designated by 62, and on proceeding into the chamber in the combustion zone designated as 64 results in complete combustion of the fuel at lower temperatures with resulting lower NOX concentrations in the flue gas emission. Location of the burner inside the refractory tube and combustion end provide adjustments for controlling burner performance and size of the initial fuel rich area. Distances 59 and 61 have been found to vary from 7 inches to 9 inches for 59, and 9 inches to 11 inches for 61, respectively.

In operation, applicants have discovered that utilizing the alternate embodiment assembly positioned with a predetermined axial distance 59 between the burner assembly and the refractory liner exit 60 employing a further predetermined projection 60 of the refractory liner 56 internal of the water wall combustion chamber 38, results in a further reduction of NOX and flue gas emissions.

Thus, it is apparent that there has been provided in accordance with the invention, method and apparatus for low NOX combustion of gaseous fuels, that fully satisfy the objects, aims and advantages as set forth in the above description.

While the burner and NOX control system disclosed herein has been described in conjunction with specific embodiments thereof, it is evident that many alternatives, modifications, and variations will be apparent to those skilled in the art of flue gas recirculated combustion systems in the light of the foregoing description. Accordingly, it is intended to embrace all such alternatives, modifications, and variations as fall within the spirit and broad scope of the appended claims.

What is claimed as new and desired to be secured by Letters Patent of the United States is:

1. In combination, a low NOX burner for a compact boiler having fuel and combustion air inputs controlled by boiler steam output pressure, and utilizing flue gas recirculation, comprising:

a refractory combustion chamber in said boiler having first and second conoidal ends and generally cylindrical walls;

inlet and outlet ports defined by said first and second ends, respectively;

heat exchange means intermediate said outlet port and a stack for exhausting products of combustion from said chamber;

a burner having an outlet abutting said inlet port, said burner having means admitting fuel and atmospheric combustion air for generating flue gas from said combustion products;

a valve intermediate said burner combustion air admitting means and ambient air;

a shaped scoop in said stack, for capturing said flue gas, said scoop fluid communicating with said combustion air admitting means;

means, upstream of said shaped scoop, sensing flue gas NOX content;

means on said valve responsive to said sensed NOX content, said means controlling said valve position, thereby adjusting flue gas recirculation to said boiler combustion chamber in accordance with upstream flue gas NOX content;

whereby a preset level of NOX in said stack discharge is maintained over said boilers firing range.

2. The improvement of claim 1 wherein the shaped scoop further comprises:

duct means projecting into said stack having an open end in said stack and a distal end in communication with said burner combustion air inlet;

a bell mouthed transition from said interior open end to the stack interior.

3. The improvement of claim 2 wherein said bell shaped transition interior end occupies essential 21% of said stack flow cross section.

4. In combination, apparatus for limiting NOX content in flue gas emission from a combustor in a compact boiler comprising:

a combustion chamber further comprising:

an essentially cylindrical chamber wall formed by coiled tubing, said tubing carrying boiler feed water for extracting heat from said combustor flue gas, said chamber having inlet and outlet ends;

means circulating said boiler feed water through said tubing for transferring heat and reducing said flue gas temperatures thereby; and, an exhaust stack abutting said chamber outlet end;

combustor means abutting said chamber inlet end for generating flue gas, further comprising:

a burner in said combustor;

gaseous fuel and combustion air inlet means in said burner; and, valve means in said air inlet intermediate said air inlet and ambient air, for controlling combustion air flow therethrough;

means supplying combustion air to said combustion air inlet;

a duct projecting into said exhaust stack;

an enlarged end on said stack projection for capturing flowing stack flue gas;

valve means in said burner combustion air inlet for admitting said captured stack flue gas;

means measuring the NOX level in said flue gases, said means generating signals indicative of gaseous NOX levels; and, means operating said combustion air inlet valve in accordance with measured NOX levels for controlling concentration of recirculated flue gas.

5. Apparatus for limiting NOX emission in a compact boiler comprising:

a compact boiler having a combustion chamber, said chamber having a combustor end and a distal heat exchange end;

an exhaust stack in said heat exchange end; and, combustion means in said combustor end for generating flue gas, further comprising:

a gaseous fuel inlet;

a combustion air inlet;

valve means in said air inlet intermediate said air inlet and ambient air, for controlling flow therethrough;

means supplying combustion air to said combustion means;

means in said stack for collecting flue gas; comprising:

a duct projecting into said stack;

a bell mouthed end on said stack projection for capturing flowing stack flue gas, means measuring NOX level in said gases, said means generating signals indicative of gas NOX level; and, means operating said valve in accordance with said NOX levels for controlling flue gas recirculation.

6. Apparatus for limiting the NOX content in flue gas emission from a compact boiler comprising:

a combustion chamber, further comprising:

an essentially cylindrical chamber wall of coiled tubing, said tubing carrying boiler feed water for extracting heat from said combustor flue gas, said chamber having inlet and outlet ends;

means circulating boiler feed water through said wall, thereby limiting combustor flue gas temperatures; and, an exhaust stack abutting said chamber outlet end; and, combustion means abutting said chamber inlet end for generating flue gas further comprising;

a burner;

a cylindrical refractory shell having a discharge end and an inlet end, said shell discharge end partially and movable extending into said combustion chamber inlet end;

means movably mounting said burner in said shell;

gaseous fuel and combustion air inlet means in said burner;

means supplying gaseous fuel and combustion air to said burner and shell fuel air inlets at said shell inlet end;

a combustion air inlet port defined by said shell extension into said chamber for admitting combustion air to said chamber, said combustion air having a flow pattern peripheral to the external surface of said shell;

means supplying combustion air to said combustion air inlet port;

means mixing said burner fuel and air internal of said shell for delivering completed and partially completed combustion products from said shell outlet end and into said chamber;

whereby combustion is completed in said combustion chamber after exiting said shell; and, ambient air inlet means;

valve means in said air inlet means intermediate said burner combustion air inlet for controlling flow of combustion air therethrough;

means in said exhaust stack for collecting predetermined amounts of flue gas flowing therethrough;

means in said combustion air inlet admitting said collected flue gas;

means measuring NOX levels in said flue gases, said means generating signals indicative of gas NOX levels; and, means operating said valve for controlling flue gas recirculation in accordance with predetermined NOX levels.

7. A method for reducing NOX content in flue gas exhaust of a compact boiler of the type having a burner using pressurized combustion air, recirculated flue gas and ambient air, comprising the steps of:

incorporating air and flue gas pressurization means;
incorporating a water wall combustion chamber;
mounting said burner in said water wall combustion chamber;
supplying ambient air to said pressurization means;
capturing a portion of said boiler flue gas;
supplying said captured flue gas to said pressurization means;
measuring NOX content of said boiler flue gas;
controlling said ambient air supplying means to maintain a predetermined NOX level in said boiler flue gas.

8. The method of claim 7 further comprising the steps of:

surrounding said burner with a refractory sleeve;
positioning said burner within said sleeve;
positioning said sleeve in said water wall combustion chamber.

9. In an automatic self-operating compact boiler of the type having a sequentially staged start-up system including a pre-ignition purge cycle of the combustion chamber, said boiler employing flue gas recirculation, the improvement comprising:

an essentially cylindrical refractory combustion chamber in said boiler having conoidal ends and oppositely positioned heat exchange and combustion ports in said ends;
a boiler stack for exhausting said flue gas;
a burner abutting said combustion port having means admitting fuel and atmospheric combustion air said burner injecting combusting fuel and air into said chamber for generating flue gases therein;
heat exchange means intermediate said heat exchange port and stack;
first valve means in said combustion air admitting means for controlling flow therethrough;
duct means in said stack for capturing flue gas;
means combining said captured flue gas and burner combustion air; and second valve means in said capturing means, operable by said start-up system during said purge for preventing admission of flue gas during the purge cycle; and means measuring NOX level in said flue gases, said means generating signals indicative of gas NOX level; and means operating said first valve means in accordance with NOX levels for controlling flue gas recirculation.

10. In a low NOX burner for a forced circulation compact boiler utilizing combustion products captured in the boiler stack and recirculated through combustion air supplied to the burner, the improvement comprising:

a combustion chamber, having oppositely positioned heat exchange and combustion means;
a stack on said heat exchange end for exhausting combustion products;
a burner in said combustion end for generating combustion products;
means supplying atmospheric combustion air to said burner;
duct means, fluid communicating said stack and combustion air means, said duct means including a bell mouthed end in said stack oriented to capture flowing stack gas.

11. The burner of claim 10 wherein said bell mouth occupies essentially 17 to 20 percent of the stack cross-sectional area.

12. In an automatic self-operating compact boiler of the type having a sequentially staged start-up system including a pre-ignition purge cycle of the combustion chamber, said boiler employing flue gas recirculation, the improvement comprising:

combustion chamber in said boiler having oppositely positioned heat exchange and combustion ends for generating high temperature flue gas comprising:
an essentially cylindrical coiled tubing chamber wall, said tubing carrying boiler feed water for extracting heat from ongoing combustion processes therein; and,
a boiler stack abutting said heat exchange end for exhausting said flue gas;
a burner in said chamber combustion end having means admitting fuel and atmospheric combustion air;
first valve means in said combustion air admitting means for controlling flow therethrough;
duct means in said stack for capturing flue gas;
means combining said captured flue gas and burner combustion air; and
second valve means in said capturing means, operable by said start-up system during said purge for preventing admission of flue gas during the purge cycle; and
means measuring NOX level in said gases, said means generating signals indicative of gas NOX level; and
means operating said first valve means in accordance with NOX levels for controlling flue gas recirculation.

* * * * *